March 5, 1935.    J. O. HAZARD    1,993,169
SEED PLANTER
Filed May 12, 1932    2 Sheets-Sheet 2
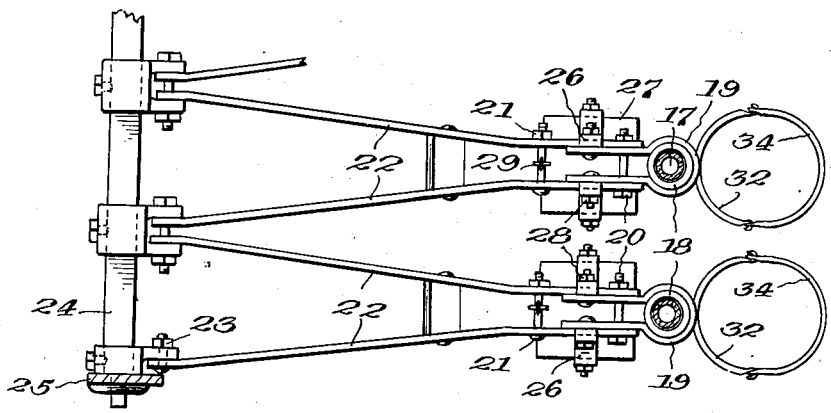
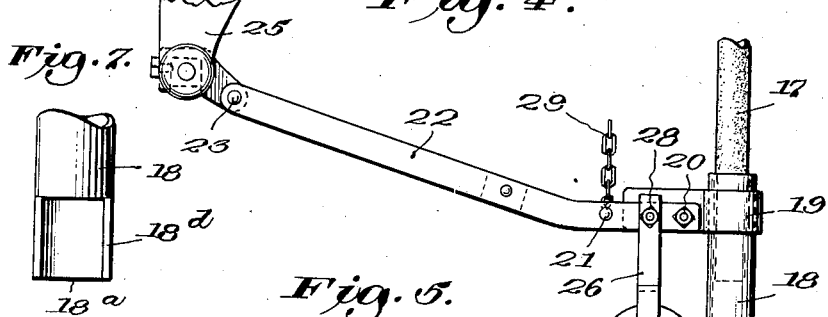
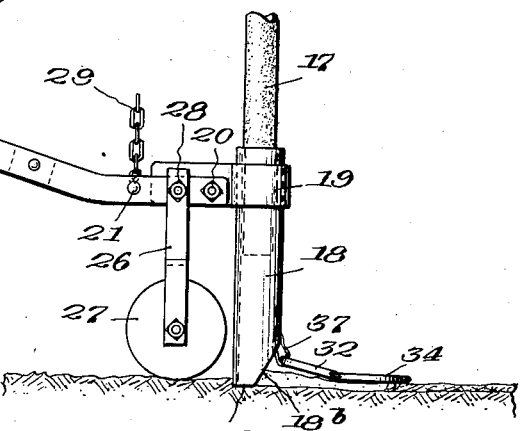
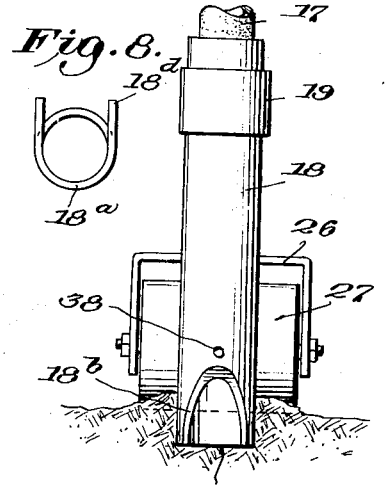
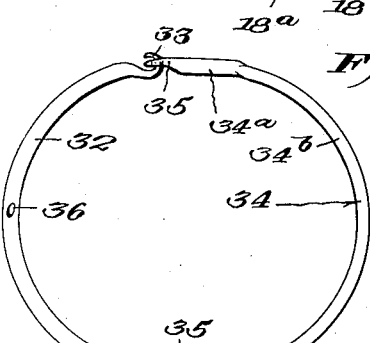
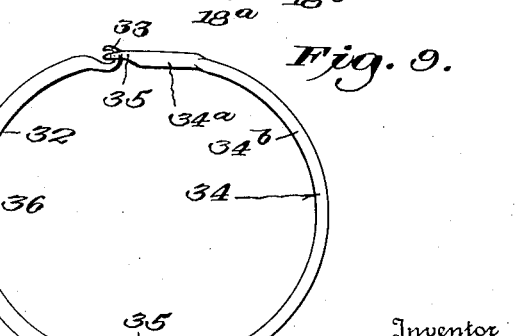

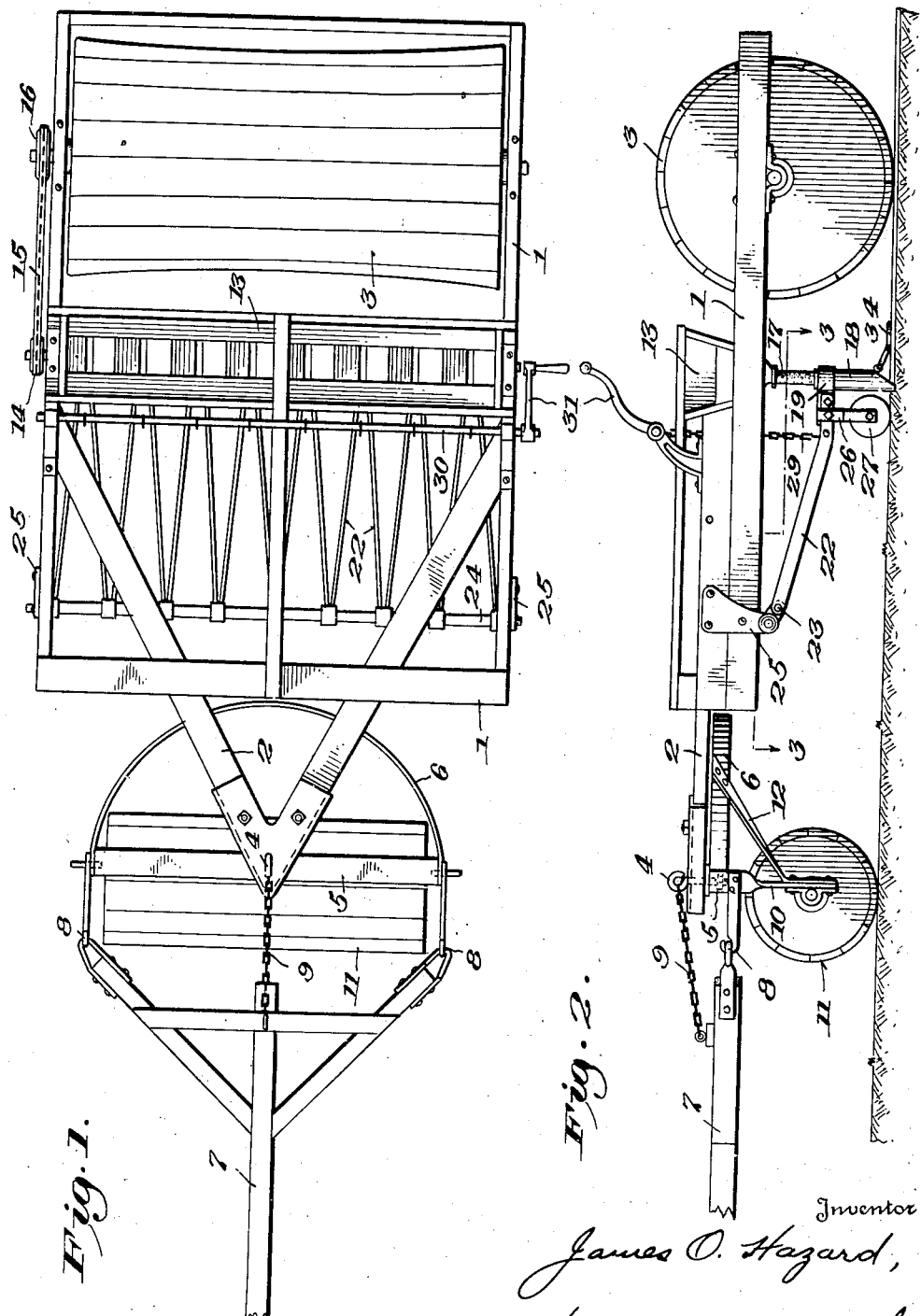

Patented Mar. 5, 1935

1,993,169

UNITED STATES PATENT OFFICE 1,993,169

SEED PLANTER

James O. Hazard, Franklin, Tenn.

Application May 12, 1932, Serial No. 610,957

2 Claims. (Cl. 111—85)

This invention relates to seed planters and more particularly to a machine for planting the seeds of forest trees.

In the carrying out of reforestation projects, it is customary to produce large numbers of small seedlings in specially prepared beds, and to subsequently transplant these seedlings into the areas to be reforested. The work of planting and covering the seeds has heretofore been done chiefly by hand.

The successful growing of these seedlings requires much care and skill, and as the seeds are relatively expensive and as relatively large quantities of them are used, it becomes important to secure as high a percentage of germination as possible.

The general object of the present invention is, therefore, to obviate the necessity for the painful and laborious hand work heretofore required, and at the same time to reduce the quantity and cost of seed necessary to fully stock a given seed bed.

Forest tree seeds of the character in question are peculiarly dependent for germination on the depth to which they are planted, and it is therefore necessary, in order to obtain the best results, to plant all of the seeds of any one kind at a uniform depth and to vary this depth for different kinds of seeds.

One of the specific objects of the present invention is, therefore, to devise a seeding machine of the grain drill type having a drill hoe or shoe of special construction, so shaped that it opens a furrow of substantially uniform depth throughout the width thereof. Another object is to provide improved means for supporting such a hoe so that it will follow the irregularities in the surface of the ground and always enter the soil to a uniform depth.

A further specific object is to devise an improved drag link so designed as to fill the furrow with approximately the same amount of earth as that removed by the drill hoe and cover seeds to a uniform depth.

A still further object is to devise a complete machine of practical and convenient form, in which a transverse series of such hoes are employed and are supported between front and rear rollers, the rear roller being of substantially the full width of the machine, and serving to drive the seed distributing devices and to compact the soil over the seed bed.

With the above and other objects in view, the invention consists in the construction and arrangement of parts hereinafter described and claimed and illustrated in the accompanying drawings, in which:

Fig. 1 is a plan view of my complete seeding machine;

Fig. 2 is a side elevation thereof;

Fig. 3 is a fragmentary horizontal section on an enlarged scale, substantially on the line 3—3 of Fig. 2;

Fig. 4 is a side elevation, on a similar scale, of the parts illustrated in Fig. 3;

Fig. 5 is a rear elevation on a still further enlarged scale, of one of the drill hoes and gauge rollers shown in Figs. 3 and 4, the drag link being omitted for the sake of clearness;

Fig. 6 is an inverted plan view of the drill hoe shown in Fig. 5;

Figs. 7 and 8 are a rear elevation and inverted plan, respectively, of a modified form of drill hoe; and Fig. 9 is an enlarged plan view of the improved drag link itself.

Referring to the drawings in detail, my improved machine comprises a main frame 1 of rectangular shape, having a forwardly tapering extension 2. The main frame is supported on a roller 3, mounted at the rear thereof, and extending substantially the full width of the frame, as clearly shown in Fig. 1. As also shown in this view, this roller is preferably formed with a slightly concave surface, in order to produce a slightly crowned seed bed.

At the forward end of the extension 2 of the main frame is a king pin 4, which pivotally connects the main frame with a transverse bolster 5, constituting part of an auxiliary front frame. A "fifth wheel" 6 is secured at its ends to the bolster 5, and also secured to such bolster are a pair of forwardly projecting brackets to the front ends of which is pivotally connected at 8 a tongue structure 7. A chain 9 is shown as connecting the king pin 4 to the tongue structure, to assist in carrying the load.

Extending downwardly from the bolster 5 are a pair of brackets 10, braced from the fifth wheel 6 by means of struts 12 and carrying bearings in which is journalled the shaft of a relatively small front roller 11, which supports the auxiliary frame. Between the rollers 3 and 11 is located my improved seeding mechanism, which will now be described.

This seeding mechanism comprises a hopper 13 extending substantially across the full width of the main frame 1, and having at the bottom thereof the usual or any desired seed discharging devices, (not shown) driven by means of a sprocket 14 through a chain 15 from a drive sprocket 16 fast on the shaft of the roller 3.

Depending from the bottom of the hopper 13 are a series of flexible tubes or boots 17, as is usual in grain drills, and each of these flexible boots fits within the upper end of a shoe or hoe 18.

This shoe or hoe is of special construction and forms an important part of the invention. As shown, it consists of a straight tubular body of uniform diameter throughout, and it may conveniently be formed of an ordinary piece of wrought iron pipe. As clearly shown in Figs. 4 and 5, this shoe is set so as to lie substantially at right angles to the surface of the ground. Instead of being provided with a sharpened point, as is usual in grain drills, the cutting edge of the hoe 18, where it engages the ground, is squared off so that it lies in a plane at right angles to the axis of the hoe, as indicated at 18$^a$. That is to say, the forward portion of the lower end of the hoe is cut off square, as described, through somewhat more than 180° of arc, while the rear portion is preferably bevelled off, as indicated at 18$^b$. The result of this is that the cutting edge of the hoe, as viewed in the direction of movement, lies in a straight line extending transversely of the furrow, as shown in Fig. 5, so that the furrow opened by such shoe or hoe is of uniform depth throughout the width thereof. By employing this novel type of cutting edge, I am able to achieve the important result that all seeds falling down through the hoe 18 are deposited in the ground at a uniform depth, whether they fall near the middle of the furrow or at the edges thereof. The purpose of extending the cutting edge of the hoe more than 180° is to provide side portions 18$^c$ which serve to prevent the earth from falling into the sides of the furrow before the seeds have reached their final position.

The same result can be accomplished even more effectively by constructing the hoe as shown in Figs. 7 and 8. By reference to these figures, it will be seen that the rear lower portion of the hoe is cut transversely and split longitudinally to provide a pair of wings 18$^d$ which extend rearwardly and tangentially from the cutting edge 18$^a$ of the hoe and thus form barriers to hold the earth back at the sides of the furrow.

Each hoe 18 is mounted in a split clamp 19, the ends of which are held together by a bolt 20. By loosening this bolt, it is apparent that the grip of the clamp 19 may be relaxed and the hoe 18 adjusted vertically through the same to any desired height, so that the depth to which it enters the ground may be regulated.

The clamp 19 is secured by the same bolt 20 to the rear end of a pair of arms 22, also held together by bolt 21, and pivotally connected at their forward ends, as shown at 23, to brackets secured to a transversely extending bar 24, mounted in brackets 25, attached to the main frame 1.

In order to cause each hoe to follow the contour of the ground and thus to cut to the same depth throughout the length of the seed bed, I support the same on an individual gauge roller or wheel 27. This is preferably carried in brackets 26, secured to the arms 22, by bolts 28, which also pass through the forward ends of the clamp 19, in order to hold it firmly in position. Thus, by reason of the pivotal connection of the arms 22 with the frame, and by reason of supporting each individual hoe by an independent gauge wheel, it is apparent that the several hoes are free to individually rise and fall to conform to variations in the surface of the ground, as the machine travels along, each such hoe therefore cutting a furrow of uniform depth throughout, both longitudinally and transversely.

While, as above described, the several hoes 18 are free to independently rise and fall, as the machine passes over the ground, I provide means by which all of these hoes may be entirely lifted clear of the ground, when the machine is transported from place to place. This lifting mechanism comprises a chain 29, secured to the bolt 21, extending through each pair of arms 22, all of such chains being secured at their upper ends to a shaft 30, around which they may be wound by turning a crank 31, secured to such shaft. It is obvious that in this way, all of the hoes and gauge wheels may be simultaneously hoisted out of contact with the ground when desired.

In order to cover up the seeds deposited in the furrow by the hoe 18, I provide an improved drag link, as shown in Figs. 3, 4 and 6. This comprises a forward arcuate or semi-circular section 32, and a rear substantially horse-shoe-shaped portion 34, pivotally connected together at their ends by hooks 33 and eyes 35. The forward section 32 is preferably provided with a hole 36 and a similar hole 38 is formed in the rear of the hoe 18, and by means of a bit of wire 37 or the like, passing through the holes 36 and 38, the drag link is pivotally attached to the rear side of the hoe, as clearly shown in Fig. 4. The rear section 34 preferably comprises relatively heavy end portions 34$^a$ disposed substantially parallel with the furrow, and a relatively light arcuate central portion 34$^b$. The advantage of this construction is that the relatively large heavy end portions tend to cause the link to closely follow the surface of the bed and to force back into the furrow all of the earth which has been displaced by the hoe, while the provision of the relatively small light central portion extending across the furrow results in a slight clearance which makes the earth flow more evenly and decreases the tendency of the link to "choke". By reason of the pivotal connection 37, and also the pivotal connection 33, 35, the rear section 34 of the drag link is entirely free to follow the contour of the ground and lies normally in a substantially horizontal plane. Furthermore, because of these pivotal connections, and also by virtue of the relatively light and heavy parts, as described, instead of the middle portion of the link tending to dig deeper than the side portions thereof, as is usually the case with drag links, all portions of the rear section 34 of my improved drag link tend to operate at substantially the same level. The arcuate portion 34 in fact constitutes a curved bar pivotally supported at its ends and extending transversely beyond the furrow at each side, so that as it is dragged along, it tends to scoop up and return to the furrow the earth thrown up on each side by the hoe 18. Furthermore, this improved link or curved bar, proportioned and arranged as shown, tends to fill the furrow level full of earth and thus cover all of the seeds to a uniform depth.

While I have described my improved seeder as especially useful for the planting of forest tree seed, it is, of course, equally applicable to other purposes where it is desirable or necessary to plant seed to a uniform depth, as, for example, in the sowing of alfalfa or other grasses or grains, as well as the seeds of truck garden vegetables. For the sowing of field and garden seeds, the drive roller 3, above described as preferably concave, would usually be of uniform diameter throughout.

What I claim is:

1. In a seeder for sowing forest tree seeds, a cylindrical drill hoe of uniform diameter throughout, the lower end of said drill hoe having a ground engaging portion having a width substantially equal to the diameter of the hoe, the edge thereof lying in a plane at right angles to the axis of the hoe and a pair of parallel tangentially and rearwardly extending wings formed integral with said drill hoe whereby the earth displaced by said hoe is prevented from filling the furrow produced by the hoe adjacent the hoe.

2. In a seeder, the combination with a bracket, of a drill hoe of uniform diameter throughout mounted in said bracket for vertical adjustment with respect thereto, the lower end of said drill hoe having at its forward side a cutting edge or a width substantially equal to the diameter of the hoe and lying in a plane at right angles to the axis of the hoe, a gauge roller carried by said bracket in front of said drill hoe and closely adjacent the cutting edge thereof, and a drag link secured to the rear side of said hoe, said drag link comprising a transversely extending bar section of a length substantially greater than the width of the hoe and pivotally connected at its middle with said hoe, and a U-shaped section pivotally connected at its ends with the ends of said bar section.

JAMES O. HAZARD.